United States Patent Office 2,961,226
Patented Nov. 22, 1960

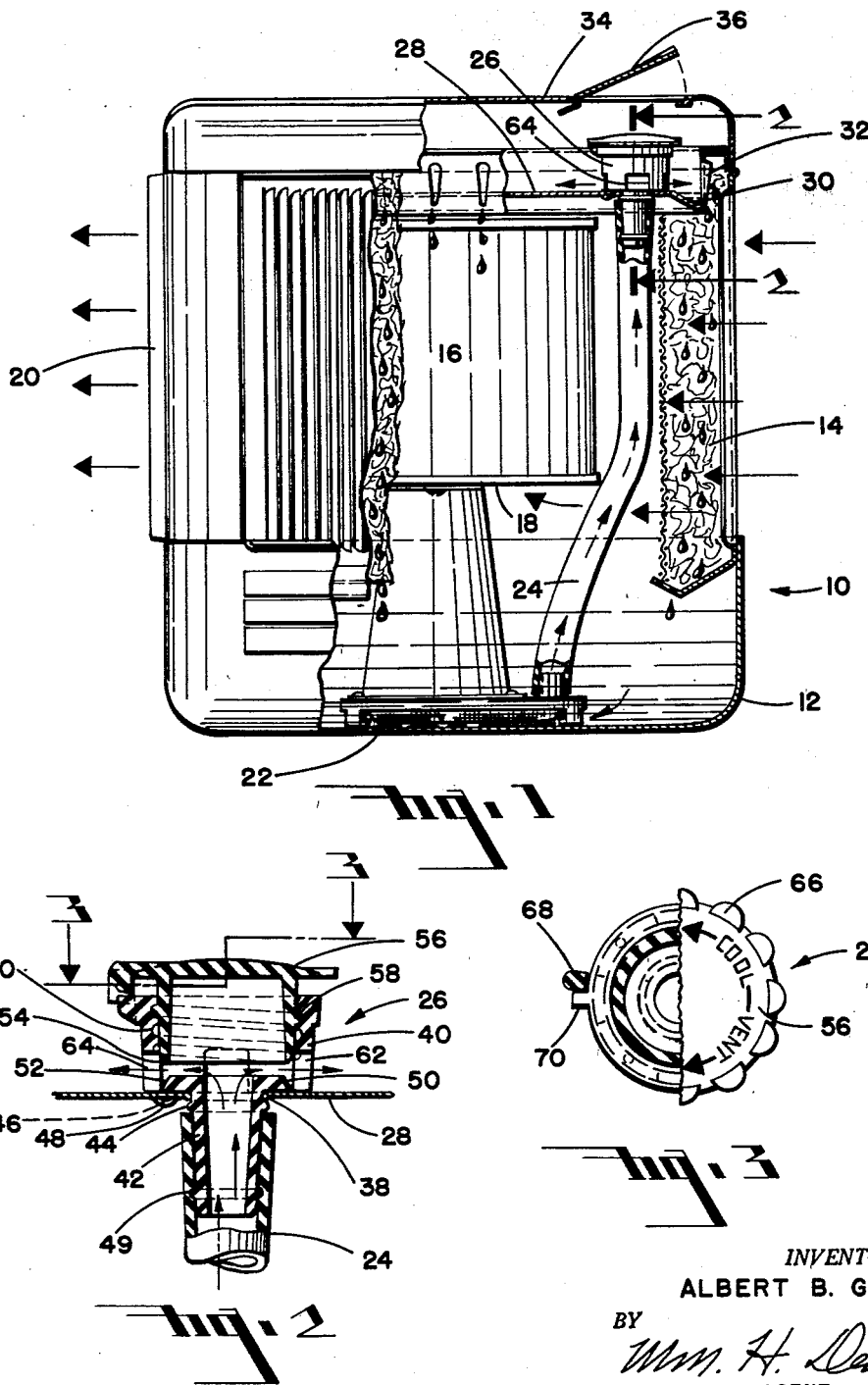

2,961,226

EVAPORATIVE COOLER AND WATER CONTROL MEANS THEREFOR

Albert B. Goettl, Phoenix, Ariz., assignor to McGraw-Edison Company, Elgin, Ill., a corporation of Delaware Filed Jan. 6, 1958, Ser. No. 707,207

7 Claims. (Cl. 261—29)

This invention relates to an evaporative cooler and water control means therefor.

In the operation of evaporative coolers it is often desired alternately to utilize an evaporative cooler to deliver cool air into a room or merely to ventilate the room by circulating the air therein without cooling the air. These alternative uses of an evaporative cooler are desirable under varying conditions such as, for example; hot weather requires that the cooler utilized to deliver cool air and during cool weather when cooling is not needed the cooler may be operated as a ventilating device.

In order that an evaporative cooler may deliver cool air the evaporative cooler pads therein must be saturated with water and when the cooler is to be used only as a ventilating device the water normally supplied to the pads must be shut off so that no evaporation will take place when the fan of the cooler forces air through the pads.

Various valves and controls have been used to control the water usage in an evaporative cooler so that it may be operated alternately as a cooler or a ventilating device, however, it has been recognized that simplification of such systems may be accomplished in order to provide a very simple and economical means for controlling the water in evaporative coolers. Such improvements according to the present invention are particularly adapted to a variety of evaporative coolers and more especially to those of the portable type.

Accordingly, it is an object of the invention to provide an evaporative cooler and water control means therefor which is very simple and economical to produce.

Another object of the invention is to provide an evaporative cooler and water control means therefor which is very simple to operate and control in order alternately to use the evaporative cooler to deliver cool air or to provide ventilation in a room by circulating the air therein.

Another object of the invention is to provide a novel combination of means for delivering water to the upper portions of evaporative cooler pads and a valve mechanism connected to the trough of such means whereby water is delivered by a recirculating pump directly to the valve located at the trough means; the valve being operable manually to select the amount of water to be delivered to the evaporative cooler pads or to provide means to turn the water on and off as desired for alternately using the evaporative cooler as a means for delivering cool air or for circulating air to ventilate a desired area.

Another obqject of the invention is to provide a novel valve construction which is particularly adapted for use in an evaporative cooler and water control means therefor.

Another object of the invention is to provide a construction of an evaporative cooler and water control means therefor which is particularly adapted for use in connection with portable evaporative coolers.

A further object of the invention is to provide a novel water control valve construction which is very readily and easily produced and which is very simply and easily connected to the structure of an evaporative cooler.

Further objects and advantages of the invention will be apparent from the following specification, appended claims and accompanying drawings in which:

Fig. 1 is a side elevational view of an evaporative cooler showing portions thereof broken away and in section and illustrating water control means internally of the evaporative cooler.

Fig. 2 is a fragmentary enlarged sectional view taken from the line 2—2 of Fig. 1 and;

Fig. 3 is a sectional view taken from the line 3—3 of Fig. 2.

As shown in Fig. 1 an evaporative cooler 10 is provided with a sump 12 adapted to receive water from the lower edges of evaporative cooler pads 14 which form three walls of the cooler. Internally of the walls 14 is a blower or fan 16 having an inlet 18 and an outlet which delivers air from one side 20 of the cooler. This blower 16 is conventional and has a motor positioned therein which operates it and a water recirculating pump 22 located in the sump 12 of the cooler.

The pump 22 has a water delivery tube 24 connected with its outlet and this water delivery tube 24 is connected to a water control valve 26 which delivers water to a pan 28 in the upper portion of the cooler.

This pan 28 has surrounding recessed trough portions 30 which are disposed above the cooler pads 14. These trough portions 30 are provided with louvered water outlets 32 which deliver water at the upper portions of the pads 14 whereby the water may gravitate therethrough and into the sump 12.

The cooler is provided with a top 34 having a small trap door 36 thereon and this trap door 36 is directly above the water control valve 26 in order to provide manual access thereto so that the valve 26 may be adjusted to turn on or shut off water which is under pressure in the tube 24 at the outlet of the pump 22. Further this valve 26 may be adjusted so that varied amounts of water will be delivered to the evaporative cooler pads 14 as desired.

Referring now to details of the valve 26 as shown in Fig. 2 of the drawings, it will be seen that the tray 28 is provided with an opening 38 therein. The valve 26 is provided with a body 40 having a downwardly projecting hollow tubular stem 42 which extends through the opening 38 in the tray 28. Adjacent to the opening 38 and on the opposite side of the tray 28 from the body portion 40 of the valve, the hollow stem 42 is provided with an external annular projection 44. This annular projection is somewhat larger in diameter than the opening 38. The material of the tubular portion 42 is resilient and this tubular portion 42 is tapered so that it may be readily projected through the opening 38. The resilient character of the material at the annular projection 44 permits compression of the tubular member 42 as it passes through the opening 38 whereupon the annular projection after passing through the opening 38 expands radially and locks the body 26 firmly in position with respect to the tray 28.

A projecting nib 46 on the body 40 extends into a conforming recess 48 in the tray 28 in order to prevent rotation of the valve body 40 when the valve is adjusted as will be hereinafter described in detail.

The hollow tubular portion 42 of the valve body 40 at its lower end is provided with an annular projection 49 which is engaged in water tight relation by the tube 24 which is fitted thereover. The tube 24 being of resilient material may be forced over the annular projection 49 on the tubular portion 42 whereon it maintains a friction tight engagement. As hereinbefore pointed out, the annular projection 49 is smaller in diameter than the opening 38 thereby readily permitting the projection of the tubular element 42 through the opening 38.

Integral with the tubular portion 42 is an annular valve seat 50 which is positioned on the opposite side of the tray 28 from the annular projection 44. The valve body 40 is so spaced from the annular projection 44 that the tray 28 is firmly gripped between the annular projection 44 and the valve body 40.

The valve seat portion 50 is provided with an inclined annular valve seat portion 52 which is engageable by a similar annular valve skirt 54 of a manually adjustable valve member 56 which is provided with external screw threads 58 engageable with internal screw threads 60 in the valve body 40.

Disposed in the cylindrical side wall portion 62 of the valve body are water outlet openings 64 located above the top of the tray 28 so that water emitted therefrom may pass laterally into the trough portions 30 of the tray 28.

The manually adjustable valve element is provided with finger engaging nibs 66 which are located around the periphery thereof. A radially directed stop member 68 is integral with the valve element 56 and is engageable with another stop element 70 projecting radially from the body 40 of the valve in order to limit maximum adjustment of the valve to rotation which equals somewhat less than 360 degrees. The pitch of the threads 58 is such that the valve seat skirt 54 will be adjusted throughout its entire range with respect to the valve seat 52 when the valve element 56 is rotated slightly less than 360 degrees with respect to the body 40. Thus, the stop 68 when engaged with the stop 70 as shown in Figs. 2 and 3 of the drawings maintains the valve in fully open position thereby permitting a maximum flow of water upwardly through the tube 24, hollow stem 42 and outwardly through the openings 64. With a clockwise movement or rotation of the valve element 56 with respect to the valve body 40 the threads 58 carry the valve seat 54 downwardly toward the valve seat 52 whereupon the flow of water therebetween is restricted, consequently the amount of water flowing outwardly through the openings 64 may be reduced in proportion to clockwise rotation of the valve element 56 relative to the valve body 40.

The water may be varied in any amount desired down to a closed position of the valve wherein the valve seat skirt 54 engages the annular valve seat 52. In this position the resilient character of the materials in the valve body 40 and the valve element 56 causes very intimate engagement of the valve seats and provides an efficient closure to prevent any water from flowing through the tube 24 and onto the tray 28.

In the production of the present water control valve the parts are made of resilient material and are produced by a well-known injection molding process. It will be seen that the stops 68 and 70 on the valve element 56 and body 40, respectively, may tend to prevent assembly of the parts due to the fact that the screw threads 58 must be helically engaged with conforming internal threads of the body 40. This engagement, however, may initially be accomplished by resilient spreading of the parts relative to each other so that the threads may be forced into the internal threads of the body 40. Whereupon the stop 68 is forced past the stop 70 and is assembled in proper relationship thereto so that helical action of the threads 58 in the conforming threads 60 of the body 40 cause proper operation of the valve skirt 54 relative to the valve seat 52.

It will be appreciated that this valve is a very economical valve to produce since all of the parts are produced by an injection molding process. Resilient material permits these parts to be readily assembled by spreading thereof despite the fact that the stop 68 tends to interfere with the stop 70 which would otherwise prevent normal helical engagement of the threads 58 and 60 when placing the valve element 56 in the valve body 40.

In operation the valve element 56 is engaged manually by the operator's finger through the trap door 36 and the valve is operated as hereinbefore described by either moving the valve element 56 in a clockwise or counterclockwise direction depending on the desired respective cooling ventilating operation of the evaporative cooler.

The resilient character of the material in the valve body 40 permits the valve element 56 to be tightened at its skirt 54 relative to the seat 52 so that an intimate and close fitting relationship of the valve elements may be attained thus providing a very efficient valve. Likewise, the resilient material of the valve body at its engagement with the opening 38 in the tray 28 provides a very simple means for assembly and means for maintaining the valve in proper fixed relation with the water distributor tray. Further, this simple construction greatly facilitates the assembly and production of evaporative coolers having such water control means.

The present valve in connected relationship with the water distributor is very simple and economical to produce in connection with evaporative coolers. Further, the present invention provides a very efficient and simple means usable to control an evaporative cooler so that it may be used to deliver cool air or to operate as a ventilating device, as desired.

It will be understood that when the valve is closed and water being delivered from the pump 22 is shut off, that no water can reach the upper portions of the pads 14 whereby they become dry thereby permitting air to pass therethrough without any evaporative cooling effect. In such condition air is merely delivered at ambient temperatures and functions as ventilating air.

It will be obvious to those skilled in the art that various modifications of the present invention may be resorted to in a manner limited only by a just interpretation of the following claims.

I claim:

1. In an evaporative cooler and water control means therefor: a water containing sump; evaporative cooling pad means thereabove; water distributor means located above said pad means and disposed to deliver water thereto; a manually operable stationary valve disposed and adjustable to control the volume flow of water to said distributor means; a pump connected with said valve and disposed to deliver water thereto, said water distributor means being a one-piece tray having trough portions at its outer edges disposed above said pad means, said valve being connected directly to said tray and having a plurality of outlet openings disposed to permit water to flow onto said tray and laterally in several directions, into said trough portions thereof above said pad means, said evaporative cooler having a top; and a trap door in said top above said valve and disposed for manual access thereto.

2. In an evaporative cooler and water control means therefor: an evaporative cooler having an evaporative cooler pad means; a water receiving sump therebelow; a blower inwardly of said pad means; a pump operably connected to said blower; means connected with said pump for delivering water to an elevated position above said pad means; a tray above said fan and said pad means; a manually operable stationary valve supported on said tray and disposed to receive water from said pump, said valve having a plurality of outlets disposed to deliver water onto said tray in several directions, said tray having trough portions above said pad means for delivering water thereto, said evaporative cooler having a top; and a trap door in said top above said valve providing manual access thereto for adjusting the same when varying the amount of water delivered through said valve and onto said tray.

3. In an evaporative cooler and water control means therefor: evaporative cooler pad means; a sump below said means; a water distributor above said pad means and disposed to deliver water to the upper portions thereof; a pump in said sump having an outlet tube extending upwardly to said water distributor; and a manually operable stationary flow adjusting valve connected to said outlet tube and supported on said water distributor, said valve having outlets disposed to deliver water to the upper portions of said distributor, said water distributor being a single piece tray and having trough portions which are recesses above said pad means; said valve having a body provided with a hollow tubular stem, said tray having an opening through which said stem extends downwardly into engagement with said tube, said valve body provided with a relatively rotatable valve element screwthreaded therein and having an annular valve skirt axially adjustable in said body by screwthreadable movement of said valve element in said body, said body having an annular seat surrounding said tubular element and engageable by the annular valve skirt of said valve element said valve having outlets disposed in several directions from said seat.

4. In an evaporative cooler and water control means therefor: evaporative cooler pad means; a sump below said means; a water distributor above said pad means and disposed to deliver water to the upper portions thereof; a pump in said sump having an outlet tube extending upwardly to said water distributor; and a manually operable stationary flow adjusting valve connected to said outlet tube and supported on said water distributor, said valve having outlets disposed to deliver water to the upper portions of said distributor, said water distributor being a single piece tray and having trough portions which are recesses above said pad means; said valve having a body provided with a hollow tubular stem, said tray having an opening through which said stem extends downwardly into engagement with said tube, said valve body provided with a relatively rotatable valve element screwthreaded therein and having an annular valve skirt axially adjustable in said body by screwthreadable movement of said valve element in said body, said body having an annular seat surrounding said tubular element and engageable by the annular valve skirt of said valve element said valve having outlets disposed in several directions from said seat and stop means projecting radially from said valve body and said valve element to limit rotational movement of said valve element relative to said valve body.

5. In an evaporative cooler and water control means therefor: evaporative cooler pad means; a sump below said means; a water distributor above said pad means and disposed to deliver water to the upper portions thereof; a pump in said sump having an outlet tube extending upwardly to said water distributor; and a manually operable stationary flow adjusting valve connected to said outlet tube and supported on said water distributor, said valve having outlets disposed to deliver water to the upper portions of said distributor, said water distributor being a single piece tray and having trough portions which are recesses above said pad means; said valve having a body provided with a hollow tubular stem, said tray having an opening through which said stem extends downwardly into engagement with said tube, said valve body provided with a relatively rotatable valve element screwthreaded therein and having an annular valve skirt axially adjustable in said body by screwthreadable movement of said valve element in said body, said body having an annular seat surrounding said tubular element and engageable by the annular valve skirt of said valve element said valve having outlets disposed in several directions from said seat and stop means projecting radially from said valve body and said valve element to limit rotational movement of said valve element relative to said valve body, said valve body and said valve element constructed of resilient material.

6. In an evaporative cooler and water control means therefor: evaporative cooler pad means; a sump below said means; a water distributor above said pad means and disposed to deliver water to the upper portions thereof; a pump in said sump having an outlet tube extending upwardly to said water distributor; and a manually operable stationary flow adjusting valve connected to said outlet tube and supported on said water distributor, said valve having outlets disposed to deliver water to the upper portions of said distributor, said water distributor being a single piece tray and having trough portions which are recesses above said pad means; said valve having a body provided with a hollow tubular stem, said tray having an opening through which said stem extends downwardly into engagement with said tube, said valve body provided with a relatively rotatable valve element screwthreaded therein and having an annular valve skirt axially adjustable in said body by screwthreadable movement of said valve element in said body, said body having an annular seat surrounding said tubular element and engageable by the annular valve skirt of said valve element said valve having outlets disposed in several directions from said seats and stop means projecting radially from said valve body and said valve element to limit rotational movement of said valve element relative to said valve body, said valve body and said valve element constructed of resilient material, said hollow tubular element having an annular projection engaging said tray adjacent said opening and at the opposite side thereof from said valve body.

7. In an evaporative cooler and water control means therefor: evaporative cooler pad means; a sump below said means; a water distributor above said pad means and disposed to deliver water to the upper portions thereof; a pump in said sump having an outlet tube extending upwardly to said water distributor; and a manually operable stationary flow adjusting valve connected to said outlet tube and supported on said water distributor, said valve having outlets disposed to deliver water to the upper portions of said distributor, said water distributor being a single piece tray and having trough portions which are recesses above said pad means; said valve having a body provided with a hollow tubular stem, said tray having an opening through which said stem extends downwardly into engagement with said tube, said valve body provided with a relatively rotatable valve element screwthreaded therein and having an annular valve skirt axially adjustable in said body by screwthreadable movement of said valve element in said body, said body having an annular seat surrounding said tubular element and engageable by the annular valve skirt of said valve element said valve having outlets disposed in several directions from said seat and stop means projecting radially from said valve body and said valve element to limit rotational movement of said valve element relative to said valve body, said valve body and said valve element constructed of resilient material, said hollow tubular element having an annular projection engaging said tray adjacent said opening and at the opposite side thereof from said valve body, said hollow tubular element having an annular projection engaging said tray adjacent said opening and at the opposite side thereof from said valve body.

References Cited in the file of this patent

UNITED STATES PATENTS

| | | |
|---|---|---|
| 970,387 | Owen | Sept. 13, 1910 |
| 981,725 | Warner et al. | Jan. 17, 1911 |
| 1,502,573 | Kuhn | July 22, 1924 |
| 1,753,833 | Mueller | Apr. 8, 1930 |
| 1,929,410 | Coey | Oct. 10, 1933 |
| 2,273,587 | Myers | Feb. 17, 1942 |
| 2,281,799 | Quave | May 5, 1942 |
| 2,319,565 | Stratton | May 18, 1943 |
| 2,486,138 | Feinberg | Oct. 25, 1949 |
| 2,583,291 | Beem | Jan. 22, 1952 |
| 2,730,905 | Pence | Jan. 17, 1956 |
| 2,731,252 | Goettl | Jan. 17, 1956 |
| 2,799,469 | Kelly | July 16, 1957 |